Jan. 15, 1929.
C. PFANSTIEHL
1,699,158
FRICTION DRIVE
Filed Feb. 26, 1927
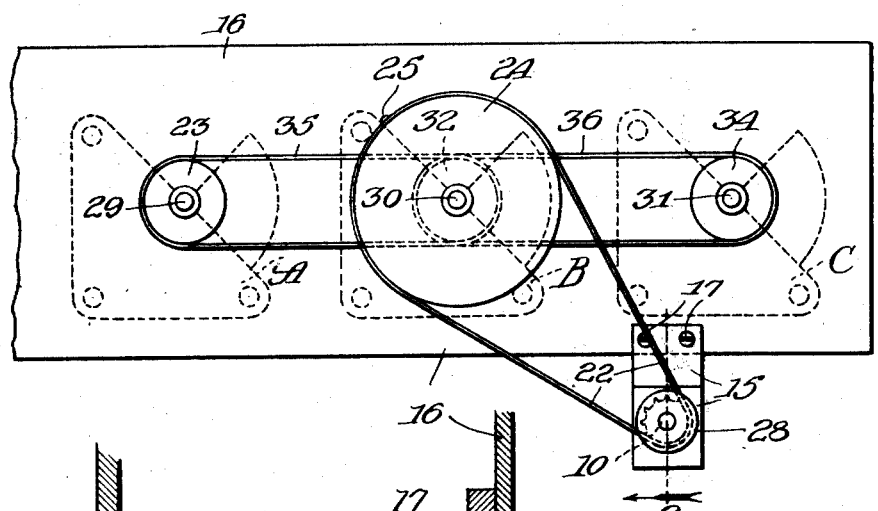
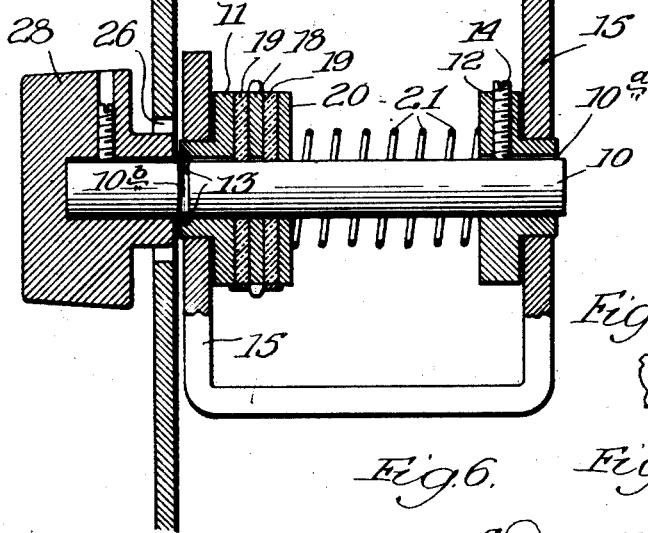
Inventor:
Carl Pfanstiehl,
By Dyrenforth, Lee, Chritton & Wiles
Attys Patented Jan. 15, 1929.

1,699,158

UNITED STATES PATENT OFFICE.

CARL PFANSTIEHL, OF HIGHLAND PARK, ILLINOIS, ASSIGNOR TO PFANSTIEHL RADIO COMPANY, A CORPORATION OF ILLINOIS.

FRICTION DRIVE.

Application filed February 26, 1927. Serial No. 171,228.

This invention relates to friction drives and is particularly adapted to the purpose of driving the shafts of condensers for use in radio receiving sets.

An object of this invention is to provide a simple and effective form of drive for this purpose, which is smooth running and at the same time has substantially no lost motion or back lash.

This and other objects, as will hereinafter appear is accomplished by this invention which is fully described in the following specification and shown in the accompanying drawing, in which:

Figure 1 is a front elevation of a gang condenser embodying the invention;

Fig. 2 is a partially enlarged section on the line 2 of Fig. 1;

Fig. 3 is a front elevation of the sprocket wheel;

Fig. 4 is a front elevation of a shore section of a metal belt perforated to fit the sprocket;

Fig. 5 is a front elevation of a fiber washer; and

Fig. 6 is an end elevation of the shaft.

The embodiment illustrated comprises the friction drive which has a shaft 10 flattened at one side at $10^a$ and having journal members 11 and 12 firmly secured thereon. The journal member 11 is secured by means of a snap ring 13 in the groove $10^b$ in the shaft 10, while the journal member 12 is adjustably secured on the shaft by means of a set-screw 14. These journal members are provided with turned shoulders which are journaled in suitable bearings in the metal bracket 15 and this is secured to the panel 16 of the gang condenser by means of the screws 17. A sprocket 18 is rotatably mounted upon the shaft 10 between fiber washers 19, the latter being punched to fit the flattened shaft 10 so that these fiber washers are rotatable with the shaft.

The two fiber washers 19 with the sprocket 18 between them are placed between the journal member 11 and a plate 20, and held by means of a helical spring 21 which bears at its other end upon the journal member 12. The plate 20 is also punched to fit the flattened shaft 10.

The metal belt 22 passes around the sprocket 18 and is provided with a series of equally spaced holes 23 which are adapted to engage the teeth of the sprocket 18. This belt is made thin enough to be quite flexible and is secured at its ends to the driven pulley 24 by means of a screw or the like 25. The shaft 10 extends through an opening 26 in the panel 27 and carries a suitable operating knob 28.

In assembling this friction drive, a paper or metal shim is placed between the journal member 11 and the bracket 15 after which the screw 14 is tightened upon the flattened portion $10^a$ of the shaft 10. The shim is then removed and a slight amount of end-play is provided between the journal members 11, 12 and the bracket 15 in which they are journaled. This insures a smooth running shaft without undue looseness, the amount of play being controlled by the thickness of the shim used.

Thus it will be seen that the pressure of the spring 21, while not effecting the operation of the journal itself, holds the sprocket 18 firmly between the fiber washers 19 so that there is sufficient friction to turn the shafts and plates of the condenser. It is desirable however that a slippage in the mechanism occur when the plates reach either their full-in, or full-out positions, where positive stops are usually employed, and this is accomplished in the present instance by means of the sprocket 18 which is free to turn between the fiber washers 19 when more than a predetermined amount of force is exerted thereon. This may be regulated by changing the length and stiffness of the spring 21.

Figure 1 shows a gang condenser having three condensers A, B and C having shafts 29, 30 and 31. The pulley 24 is secured to the central shaft 30 and this in turn carries a pulley 32 which drives pulleys 33 and 34 on the shafts 29 and 31 respectively by means of thin metal ribbons or belts 35 and 36.

Thus it will be seen that a very simple and efficient type of friction drive is provided having provision for taking up any slack so that there will be very little lost motion or backlash therein and which will at the same time turn smoothly and freely.

While I have shown and described but a single embodiment of this invention, it is to be understood that it is capable of many modifications. Changes therefore in the construction and arrangement may be made which do not depart from the spirit and scope of the invention as disclosed in the appended claim.

I claim:

A friction drive comprising a shaft, a sprocket rotatably mounted thereon, journal members secured to said shaft at its two ends, bearings for said journal members, a friction washer on each side of said sprocket and having interengaging means causing them to rotate with said shaft, said washer and the body of said sprocket being of the same diameter, a perforated band adapted to run on said sprocket and washer, and yieldable means held between said journal members for applying pressure to said plates to drive said sprocket.

CARL PFANSTIEHL.